Nov. 27, 1962   L. J. CRITELLI ETAL   3,065,654
HOLE CUTTING ATTACHMENT FOR ELECTRIC DRILLS
Filed Feb. 2, 1960
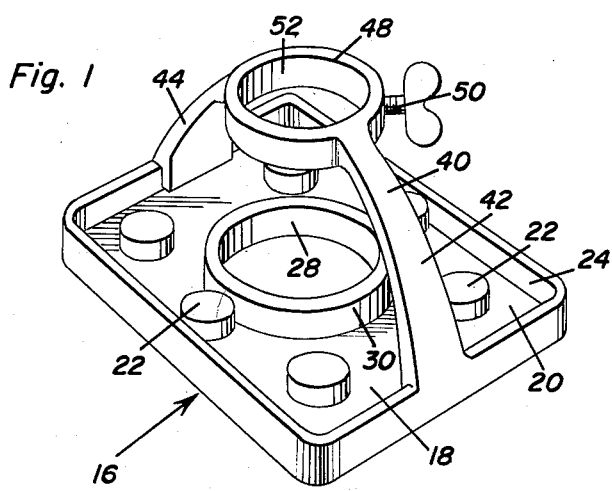
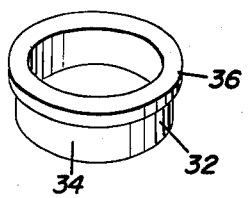
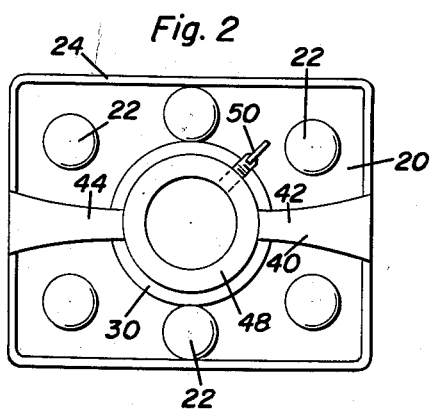
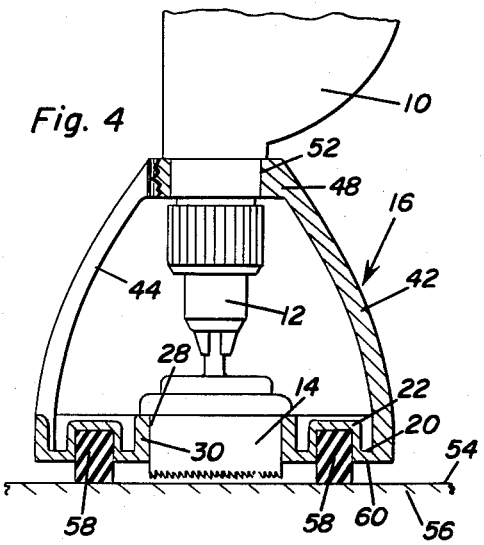
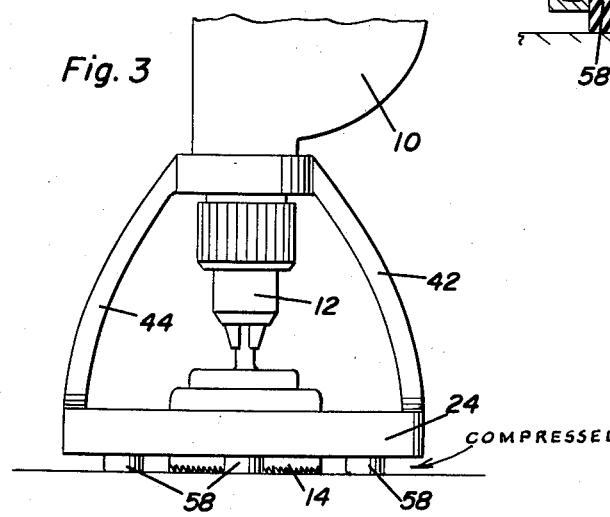
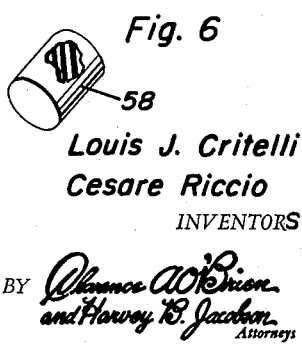
Louis J. Critelli
Cesare Riccio
INVENTORS

United States Patent Office 3,065,654
Patented Nov. 27, 1962

3,065,654
HOLE CUTTING ATTACHMENT FOR
ELECTRIC DRILLS
Louis J. Critelli, 30 Emmons St., Long Branch, N.J., and
Cesare Riccio, Long Branch, N.J. (2 Alvord St., Oakhurst, N.J.)
Filed Feb. 2, 1960, Ser. No. 6,187
4 Claims. (Cl. 77—7)

This invention relates to portable hand drill attachments and more particularly to an attachment which will enable a person to drill a hole in a workpiece without clamping the workpiece, and to drill the hole with accuracy.

Briefly, the invention is embodied in an attachment for a portable electric drill which will enable a person to cut a perfect circular disk by using a conventional hole cutter and without using the pilot drill as is ordinarily done. Although the attachment for the hand drill is used principally as a repair device, it is to be understood that all the uses falling within the comprehension of the invention may be resorted to.

Often, plastic, composition, plywood-composition laminate material counter tops, table tops, etc., linoleum, tiles and other similar material, become damaged. The damage may be a cigar or a cigarette burn and is ordinarily something taking up a very small area. When these materials become accidentally damaged it is very difficult and time-consuming as well as costly to make repairs on the premises.

The hole cutting attachment for an ordinary drill, is made of a base together with a support for the drill. The base is of special construction and has an opening adapted to receive a conventional hole cutter. The opening is in alignment with the axis of the drill when it is attached to a support, and the base has resilient means for engaging the surface which is to be repaired. These resilient means, for instance a rubber pad, rubber feet, rubber ring, etc. are carried by the base and engage the work surface when the base is placed on the surface. With the hole cutter in place, the drill is set into operation and pushed downwardly toward the work surface. The downward thrust is first received by the resilient surface engaging means, and they compress thereby frictionally establishing connection between the attachment base and the work surface. Then, further downward thrust brings the hole cutter into gentle contact with the surface which is to be repaired. Continued downward thrust while the hole cutter is in operation, enables a person to remove a perfect circular plug or disk from the repair surface material so that it may be replaced with a precut plug of identical material made by the attachment.

A great difficulty is overcome by the invention. If a person tried to use a hole cutter in a drill without an attachment such as described herein, the hole cutter would practically invariably "walk" along the smooth surface which is to be repaired. This will cause additional damage. Furthermore, the attachment in accordance with the invention provides an excellent support for the drill enabling it to be held at right angles to the work surface at all times during the complete cutting operation. As a consequence the side walls of the hole left when the disk is removed, are perfectly cylindrically formed and do not taper, whereby a precut plug may be installed and form a repair job which is practically incapable of detection when the repair is completed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an attachment exemplifying the invention.

FIGURE 2 is a top view of the attachment in FIGURE 1.

FIGURE 3 is a side elevational view showing the attachment in use.

FIGURE 4 is a cross sectional view showing the attachment resting on a workpiece prior to the application of a downward thrust on the hand drill.

FIGURE 5 is a perspective view showing an insert bushing to be used with smaller diameter hole cutters.

FIGURE 6 is a perspective view of a rubber plug to be used as a portion of the resilient means for engaging the attachment with the surface that is to be repaired.

In the accompanying drawings there is an illustration of a conventional hand drill 10 having a chuck 12 and a conventional hole cutter 14 engaged in the chuck. These parts are purely conventional.

Attachment 16 is specifically designed to be used with conventional hand drill 10. It is made of a base 18, and the base may be square, rectangular or of any other shape. The base has an essentially flat panel 20 with a plurlity of downwardly opening sockets 22 formed therein and spaced from the upstanding reinforcing rim 24 at the perimeter of the panel 20. There is a central opening 28 in panel 20, and it has an annular marginal wall 30 encircling the periphery thereof and defining a collared guide opening. This opening receives cutter 14 and may also receive an insert bushing or an adapter 32 to reduce the effective diameter of opening 28 when a smaller conventional hole cutter is used in place of hole cutter 14. The insert bushing 32 has a cylindrical side wall 34 which fits within side wall 30, and it has a lateral flange 36 at the upper edge thereof adapted to shoulder on the upper edge of wall 30.

Support means 40 is connected to panel 20 by way of the rim 24. The support may be made in a number of ways, one of which is a yoke embodying a pair of arched braces 42 and 44 rigidly connected with, as by being made integral with or welding lower ends thereof to opposite sides of rim 24. The upper ends of the braces 42 and 44 have collar 48 fixed thereto, and there is a fastener, for example setscrew 50 carried in a threaded opening in collar 48. The setscrew, upon tightening, engages the neck of the hand drill 10, i.e. a portion of the drill body near the chuck 12, and holds the attachment firmly secured to the hand drill. The central opening 52 defined by collar 48, is in axial alignment with opening 28.

There are resilient means carried by the base 18, for engaging the work surface 54 of workpiece 56 and holding the attachment in place on surface 54. Although the resilient means may assume a number of configurations, the illustrated means consist of a number of rubber plugs 58 cemented or otherwise held in sockets 22. The rubber plugs depend below the lower surface 60 of panel 20 and also below the hole cutter 14 when it is properly placed in opening 42. The shape of the lower faces of the plugs may be varied, for instance, concave, convex, flat, etc. Furthermore, it is within the purview of the invention to use a rubber ring in place of the plurality of plugs 58, a rubber pad, or to use plugs of other shapes. The important point is that the resilient means project below surface 60 and make initial contact with the work surface 54 ahead of the cutting edge of hole cutter 14.

In use, the attachment 16 is connected with drill 10, and the hole cutter 14 is properly placed as described previously. The resilient means 58 are then placed on surface 54 and initial downward thrust is applied to the hand drill 10. This causes the resilient plugs 58 to compress and establish a frictional bond between surface 54 and the plugs. Further pressure applied to the hand drill 10 will bring the cutting edge of the hole cutter 14 in engagement with surface 54, and the hole is gradually cut. Thereafter the hand drill and attachment are removed so that the hole formed in workpiece 56 may be filled by a repair disk (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in supporting, steadying and controlling a portable hand drill while operating a circular cutter carried by the drill's chuck; a readily applicable and removable attachment for said drill comprising a substantially planar panel providing a base and having top and bottom sides and a centrally located guide opening with an upstanding marginal rim constituting a cutter guide and bearing as well as a panel rigidifying collar, pressure responsive anti-skid resilient means carried by the bottom of the panel and depending from the bottom a distance which suspends the bottom in a predetermined plane spaced above the surface of the work, a drill embracing and supporting collar, and rigid means joining said supporting collar to said base and elevating it so that its axial center is in axial alignment with the underlying axial center of the first-named collar said means comprising a yoke arching over and above the top of said base panel, said yoke embodying arched braces integrally joined at lower ends to the marginal portions of the base panel and joined at upper ends to and supporting said drill supporting collar.

2. For use in supporting, steadying and controlling a portable hand drill while operating a circular cutter carried by the drill's chuck; a readily applicable and removable attachment for said drill comprising a generally planar panel providing a base having top and bottom sides, said panel having a centrally located guide opening with an upstanding surrounding marginal rim serving as a rigidifying collar, said panel being marginally surrounded by an endless upstanding reinforcing rim, said panel being provided inwardly of said rim with spaced distributively arranged sockets opening through the bottom of the panel, individual compressibly resilient cushioning plugs plugged and fitted removably into the sockets and having lower ends depending below the plane of the bottom of the panel and terminating in a predetermined common plane to level and support the bottom of the panel a required distance above the surface of the work, a drill embracing and supporting collar of a diameter slightly less than the diameter of the rigidifying collar, and an arched yoke embodying arched braces joined at upper ends to diametrically opposite sides of the second-named collar and joined at lower ends to transverse end portions of said reinforcing rim.

3. The structure defined in claim 2 and wherein the overall attachment is of one piece construction, said panel being rectangular in plan and said rim being situated in a plane wholly above the plane of the top of said panel, said second-named collar being provided with a setscrew and cooperating with the yoke in providing a carrying handle.

4. A readily applicable and removable attachment for a hand drill provided with an annular hole cutter, said attachment comprising a generally planar base having a centralized opening therein adapted to guidingly receive and steady the hole cutter when the latter is in operation, drill supporting and stabilizing means rigidly connected with said base and embodying a collar for supporting the drill in alignment with the opening receiving the hole cutter, and self-adapting compressibly resilient anti-skid and cushioning means carried by the work-confronting bottom of said base and adapted to engage the work surface for securing the base to the work surface by frictional engagement therewith, said resilient means normally projecting beyond the plane of said bottom a distance greater than the hole cutter is allowed to project beyond said bottom so that upon the application of hold-down force on the base, said resilient means are first compressed before the hole cutter engages the surface of the work, said resilient means comprising a plurality of rubber plugs, and said base having sockets distributively arranged within the outer marginal limits of said base, said sockets projecting above the plane of the top side of said base and being closed but opening at bottom ends through the bottom side of said base and in which said rubber plugs are replaceably fitted and held.

References Cited in the file of this patent

UNITED STATES PATENTS

| 1,281,627 | Misener et al. | Oct. 15, 1918 |
| 2,151,205 | Hawn | Mar. 21, 1939 |
| 2,360,942 | Ellerstein | Oct. 24, 1944 |
| 2,680,435 | Gonzalez | June 8, 1954 |
| 2,775,032 | Sorensen | Dec. 25, 1956 |

FOREIGN PATENTS

| 1,187,549 | France | Sept. 11, 1959 |